United States Patent

Morita et al.

[15] 3,676,583

[45] July 11, 1972

[54] JITTER CORRECTION SYSTEM

[72] Inventors: Akiyoshi Morita; Yukio Itoh, both of Yokohama, Japan

[73] Assignee: Victor Company of Japan, Ltd., Yokohama, Kanagawa-ken, Japan

[22] Filed: Aug. 13, 1970

[21] Appl. No.: 63,425

[30] Foreign Application Priority Data

Aug. 13, 1969 Japan....................................44/64360

[52] U.S. Cl...............178/6.6 TC, 178/69.5 DC, 340/174.1 B

[51] Int. Cl..........................................H04n 5/04, H04n 5/78

[58] Field of Search..................................178/6.6 A, 6.6 TC; 340/174.1 B

[56] References Cited

UNITED STATES PATENTS

| | | | |
|---|---|---|---|
| 3,225,134 | 12/1965 | Jensen | 178/6.6 TC |
| 3,409,736 | 11/1968 | Hurst | 178/6.6 TC |
| 3,371,158 | 2/1968 | Tanaka | 178/6.6 TC |
| 3,347,997 | 10/1967 | Woodruff | 178/6.6 TC |

*Primary Examiner*—Howard W. Britton
*Attorney*—Louis Bernat

[57] ABSTRACT

A jitter correction system detects and removes a jitter component, of relatively high frequency, from a reproduced video signal. A reference signal is phase modulated by a jitter component of relatively low frequency. The modulated reference signal and the reproduced signal are compared in phase. The jitter component of low frequency is taken out from the phase-compared error output and fed back to the phase modulating means. On the other hand, the jitter component of high frequency is effectively taken out from the error output.

6 Claims, 5 Drawing Figures

INVENTORS.
AKIYOSHI MORITA
YUKIO ITOH

BY

INVENTORS.
AKIYOSHI MORITA
YUKIO ITOH

BY

[signature]

INVENTORS.
AKIYOSHI MORITA
YUKIO ITOH

BY

JITTER CORRECTION SYSTEM

This invention relates to a jitter correction system, and more particularly to a system for removing a jitter component of relatively high frequency included in a signal reproduced from a video signal magnetic recording and reproducing apparatus.

In general, there is an apparatus for recording a video signal on a magnetic tape and reproducing it therefrom by rotary magnetic heads. The apparatus is hereafter called as a video tape recorder or VTR apparatus. In the VTR apparatus, a signal reproduced from the magnetic tape generally has jitter components. The jitter components include fluctuations of the signal in a time axis direction, and it is called a "time axis" error. The jitter consists of a first jitter component of relatively low frequency, for example less than 10 Hz, generated by the tape transport system and a second jitter component of relatively high frequency, for example more than 30 Hz, generated by a rotating system of magnetic heads caused from rotation irregularities. This jitter results from the following causes: an elongation and contraction of the tape responsive to the temperature and the tension of the tape; wow and flutter in a tape driving system; and rotation irregularities of a tape reel etc., in the magnetic tape transport system. In the rotation system of the magnetic head, there are the following causes of jitter: a rotation irregularities of the magnetic head, oscillation of the head servo system and the like.

The jitter component of relatively low frequency is quantitatively larger than the jitter component of relatively high frequency. However, the former low frequency jitter component can be effectively removed by an AFC action of an automatic frequency control (AFC) circuit provided in a monitor reproducing receiver. The latter high frequency jitter component is rather less in quantity, but it cannot be removed effectively by the AFC circuit in the receiver. Accordingly, the unremoved jitter component produces a distortion on a reproduced picture image. Therefore, for obtaining a good picture image reproduced on the receiver, a means is required for correcting the jitter component of relatively high frequency.

A conventional jitter correction system is somewhat as described below. The conventional system consists of a first phase comparator means for comparing phases of a vertical synchronizing signal of a reproduced signal including the jitter components and a vertical synchronizing signal of an external reference signal. The reference signal is phase modulated by the low-frequency component of the error signal taken out from the first phase comparator means. A second phase comparator means compares the phases of the modulated reference signal from the phase modulating means and the reproduced signal. The jitter of the reproduced signal is corrected responsive to an output error signal of the second phase comparator means. The conventional system as hereinabove described involves a disadvantage that it requires a complicated operation for arranging phases of the vertical synchronizing signal of the reference signal and the vertical synchronizing signal of the reproduced signal to be corrected.

On the other hand, a system may be proposed for merely comparing a reference horizontal synchronizing signal and a horizontal synchronizing signal reproduced from the VTR apparatus. However, in this case, the proposed system has a defect since a continuous error output can not be obtained because the jitter component of low frequency changes over some H periods (1H: one horizontal scanning line period). Thus, a sampling point moves to another saw tooth wave.

According to the system of the present invention, therefore, a reference signal is made to previously possess a jitter component changing over 1 H period by means of a phase modulator. The phase modulated reference signal and the reproduced signal are compared in phase. Thus, the jitter component of low frequency extending over 1H period is removed and cannot be detected. Only the jitter component of high frequency need be continuously and effectively taken out. The present invention is intended to deal with the signal as above described.

Accordingly, it is a general object of the present invention to provide a novel and useful jitter correction system which removes the disadvantages of the above described conventional system.

Another object of the invention is to provide a jitter correction system which can detect and effectively correct only the jitter component of relatively high frequency.

A further object of the invention is to provide a jitter correction system which can effectively cancel the jitter component of relatively low frequency, by a closed loop circuit, and which can detect the jitter component of relatively high frequency for correction.

A still further object of the invention is to provide a system which phase modulates the reference signal by the frequency component requiring no correction taken out from a video signal reproduced from the VTR apparatus and takes out the desired jitter component of high frequency by comparing the modulated signal with the signal having the jitter.

These and other features and objects of the invention will become apparent from the following description when read in conjunction with the accompanying drawings, in which.

Figure 1:
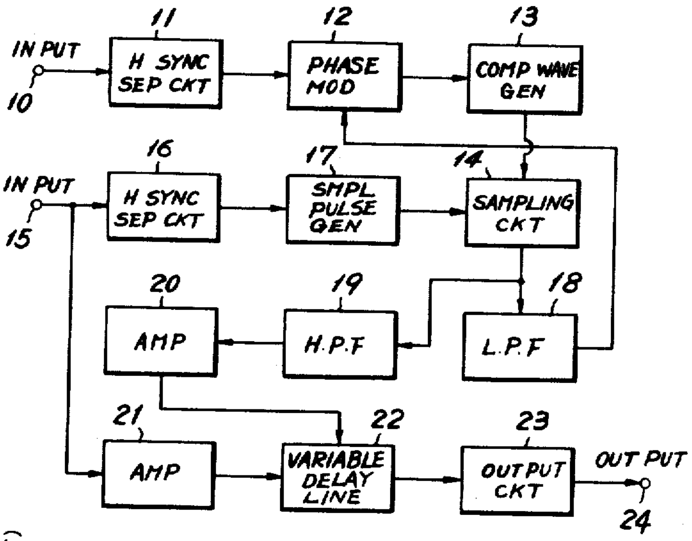
FIG. 1 is a block diagram illustrating a fundamental embodiment of the system according to the invention.

Referring now to FIG. 1, the principle of the system according to the invention will be described. A reference signal is supplied, through an input terminal 10, to a horizontal synchronizing signal separation circuit 11. In this embodiment, the reference signal is a standard television video signal. However, if the reference signal is, for example, a reference horizontal synchronizing signal supplied from a synchronizing signal generator (not shown), the synchronizing signal separation circuit 11 can be omitted.

In the horizontal synchronizing signal separation circuit 11, a horizontal synchronizing signal is separated from the reference signal. A pulse series of the separated horizontal synchronizing signal is supplied to a phase modulator 12. This synchronizing signal pulse series is shown by the pulses $ha_1$, $ha_2$ —— in FIG. 2(A).

In the phase modulator 12, the horizontal synchronizing signal is phase modulated by a signal supplied from a low-pass filter 18. The signal from the low-pass filter 18 is, for example, a jitter component of a relatively low frequency, which may be less than 10 Hz. The phase modulated signal from the phase modulator 12 is fluctuating in the time axis direction as shown by pulses $hb_1$, $hb_2$ —— in FIG. 2(B). This phase modulated signal is supplied to a comparison waveform generating circuit 13.

Figure 2:
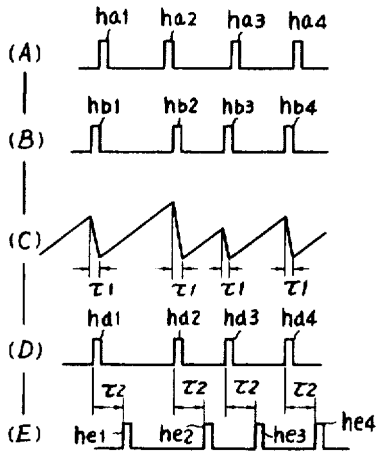
FIG. 2 is a diagram of waveforms illustrating the action of the system shown in FIG. 1.

A saw tooth wave is generated in the comparison waveform generated circuit 13, as shown in FIG. 2(C). The saw tooth is controlled at its starting position of the downward slope, responsive to the front edge of the phase modulated pulse signal, shown in FIG. 2(B). The saw tooth wave starts its subsequent upward slope at a definite time $\tau_1$ after its start of the downward slope. The generated saw tooth wave is supplied to a sampling circuit 14.

On the other hand, a video signal (having jitter components reproduced from a magnetic tape) is supplied, through an input terminal 15, to a horizontal synchronizing signal separation circuit 16 and to an amplifier 21. A pulse series of a horizontal synchronizing signal is separated from the reproduced video signal in the horizontal synchronizing signal separation circuit 16. This includes pulses $hd_1$, $hd_2$ —— having jitter components over a frequency range from low frequency to high frequency as shown in FIG. 2(D). The pulses fluctuate in the time axis direction. The pulses from the separation circuit 16 are formed into a pulse series $he_1$, $he_2$, —— delayed by a definite time $\tau_2$, in a sampling pulse generating circuit 17 as shown in FIG. 2(E).

The sampling pulse from the sampling pulse generating circuit 17 is supplied to the sampling circuit 14. In the sampling circuit 14, this sampling pulse samples the saw tooth wave supplied from the comparison waveform generating circuit 13. Thus, there is obtained an error signal from the sampling circuit 14, in response to the error in the time axis of the jitter component in the reproduced signal.

The output error signal of the sampling circuit 14 is supplied, on one hand, to a low-pass filter 18 having an upper limit passing frequency of 10 Hz. Then only a jitter component of relatively lower frequency (a jitter component of frequency less than 10 Hz) is filtered out. The output of the low-pass filter 18 is fed back to the phase modulator 12, as hereinabove described. Accordingly, a closed feed-back loop is formed including the phase modulator 12, comparison waveform generating circuit 13, sampling circuit 14, low-pass filter 18, phase modulator 12. Responsive to signals fed back via this closed loop, the jitter of relatively low frequency component is effectively cancelled and removed out of the jitter components of the reproduced signal passing through the sampling circuit 14.

The output error signal of the sampling circuit 14 is, a lower limit passing frequency of 10 Hz. Now, the jitter component of relatively low frequency is removed from the output signal sampling circuit 14. Therefore, on the other hand, supplied to a high-pass filter 19 having only a jitter component of relatively high frequency (mainly a jitter component of frequencies above 30 Hz) is effectively and readily filtered out. The output jitter component of the high-pass filter 19 is amplified by an amplifier 20 and, thereafter, supplied to a variable delay line 22.

The signal supplied from the terminal 15 and amplified by an amplifier 21 is also supplied to the variable delay line 22. The reproduced signal having the jitter components supplied to the variable delay circuit 22 undergoes a voltage control responsive to the signal supplied from the amplifier 20, and its jitter component of relatively high frequency is thereby removed. The output signal of the variable delay line 22 is taken out from an output terminal 24 by way of an output circuit 23. The output signal taken out of the output terminal 24 contains the jitter component of relatively low frequency. However, this jitter component is removed by the AFC circuit in the receiver without trouble, as hereinbefore described.

According to the system of the invention, the jitter component of relatively low frequency is removed by the closed loop circuit as hereinabove described. Therefore, it is able to take out effectively the jitter component of relatively high frequency from the output signal of the sampling circuit 14. Thus, it is not necessary to provide a means and operations for coinciding the phase of the vertical synchronizing signal of the reference signal with the phase of the vertical synchronizing signal of the reproduced signal.

Figure 3:
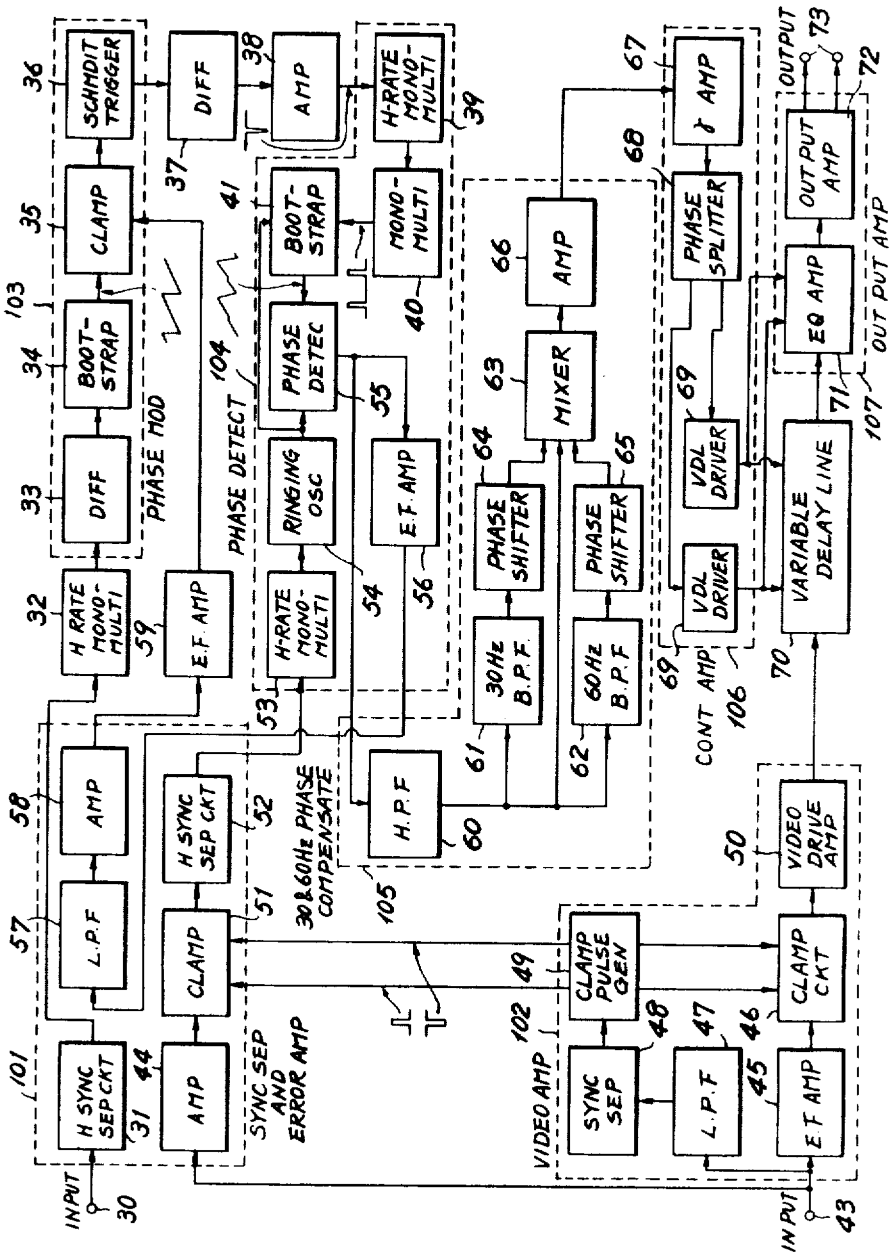
FIG. 3 is a block diagram of an exemplary embodiment of the system of the invention.
Figure 4:
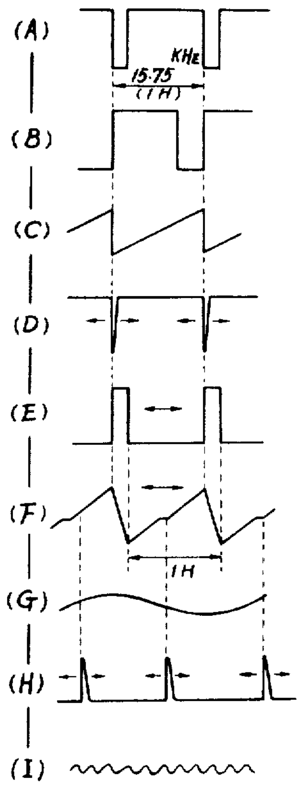
FIG. 4 is a diagram of waveforms illustrating the action of the system shown in FIG. 3.

In FIG. 3, a block diagram of an actual and concrete embodiment of the system of the invention is shown. A reference signal is supplied, through an input terminal 30, to a horizontal synchronizing signal separation circuit 31 in a synchronizing signal separation and error amplifier block 101, here shown enclosed by broken lines. A horizontal synchronizing signal, as shown in FIG. 4(A), is separated from the reference signal in the separation circuit 31. The horizontal signal triggers an H-rate monostable-multivibrator 32. A rectangular wave output of frequency 15.75 KHz shown in FIG. 4(B) is obtained from the monostable multivibrator 32 and then supplied to a differentiation circuit 33 in a phase modulator block 103, here shown enclosed by broken lines.

The output of the differentiation circuit 33 is supplied to a bootstrap circuit 34. An output saw tooth wave shown in FIG. 4(C) of the bootstrap circuit is supplied to a clamp circuit 35. An output of the clamp circuit 35 is supplied to a Schmidt trigger circuit 36. An output of the trigger circuit 36 is supplied to a differentiation circuit 37. An output pulse of the differentiation circuit 37 is amplified by an amplifier 38 and thereafter supplied to an H-rate monostable-multivibrator 39 in a phase detector block 104, here shown enclosed by broken lines. Herein, the signal supplied to the monostable-multivibrator 39 is phase modulated in the phase modulator block 103, as later described. The supplied signal is a pulse signal fluctuating in the time axis direction, as shown in FIG. 4(D).

An output of the H-rate monostable-multivibrator 39 triggers a following monostable-multivibrator 40. An output signal of the monostable-multivibrator 40 is a rectangular wave as shown in FIG. 4(E) and fluctuating in the time axis direction. The output signal of the multivibrator 40 is supplied to a bootstrap circuit 41 and generates a saw tooth wave.

On the other hand, a video signal having jitter components reproduced from a magnetic tape is supplied, through an input terminal 43, to an amplifier 44 and a video amplifier block 102, here shown enclosed by broken lines. The reproduced video signal supplied to the block 102 is supplied, through an emitter follower amplifier 45, to a clamp circuit 46. On the other hand, the reproduced video signal supplied to the block 102 is supplied, through a low-pass filter 47 of 300 KHz, to a synchronizing signal separation circuit 48. A synchronizing signal separated by the separation circuit 48 is supplied to a clamp pulse generator 49. Clamp pulses generated by the generator 49 are supplied to the clamp circuit 46 and a clamp circuit 51.

An output of the amplifier 44 is passed through the clamp circuit 51 to a horizontal synchronizing signal separation circuit 52 where a horizontal synchronizing signal is separated from the video signal. The separated horizontal synchronizing signal is supplied to an H-rate monostable-multivibrator 53 in the block 104, and the output thereof is supplied to a ringing oscillator 54. An output of the oscillator 54 is a pulse signal, as shown in FIG. 4(H), and has jitter components fluctuating in the time axis direction from low frequency to high frequency. The output of the oscillator 54 is supplied to a phase detector (sampling circuit) 55 and the bootstrap circuit 41.

The output signal of the bootstrap circuit 41 is a saw tooth wave shown in FIG. 4(F) fluctuating in the time axis direction in response to the jitter of a rectangular wave [shown in FIG. 4(E)] supplied from the monostable-multivibrator 40. The saw tooth wave is supplied to the phase detector 55. In the phase detector 55, the saw tooth wave shown in FIG. 4(F), supplied from the bootstrap circuit 41, is sampled by the pulse [shown in FIG. 4(H)] supplied from the ringing oscillator 54. The sampled output of the phase detector 55 is a signal of jitter components.

The output of the phase detector 55 is supplied, through an emitter follower amplifier 56, to a low-pass filter 57 having the upper limit passing frequency of 10 Hz. The jitter component of relatively low frequency is filtered by the low-pass filter 57, and the resulting signal is supplied, through an amplifier 58 and emitter follower amplifier 59, to the clamp circuit 35 in the block 103.

Accordingly, a closed feedback loop is formed including the clamp circuit 35, Schmidt trigger circuit 36, differentiation circuit 37, amplifier 38, H-rate monostable-multivibrator 39, monostable-multivibrator 40, bootstrap circuit 41, phase detector 55, emitter follower amplifier 56, low-pass filter 57 amplifier 58 emitter follower amplifier 59 and clamp circuit 35. Through this closed loop, an output signal taken out of the phase detector 55 cancels the jitter component of relatively low frequency. Therefore, the output of the phase detector 55 is just the jitter component of relatively high frequency.

The output of the phase detector 55 is, on the other hand, supplied to a high-pass filter 60 having the lower limit passing frequency of 10 Hz. Filter 60 is in a 30 Hz and 60 Hz phase compensator block 105. The low frequency jitter component of the output signal of the phase detector 55 has been already cancelled by the feedback via the above mentioned closed loop. Consequently, the jitter component of relatively high frequency (higher than 10 Hz) is effectively filtered out from this output signal. The jitter component filtered by the high-pass filter 60, as shown in FIG. 4(I), is supplied to a 30 Hz band-pass filter 61, a 60 Hz band-pass filter 62, and a mixer 63. Also, outputs of the band-pass filters 61 and 62 are supplied, through phase shifters 64 and 65, to the mixer 63.

Figure 5:
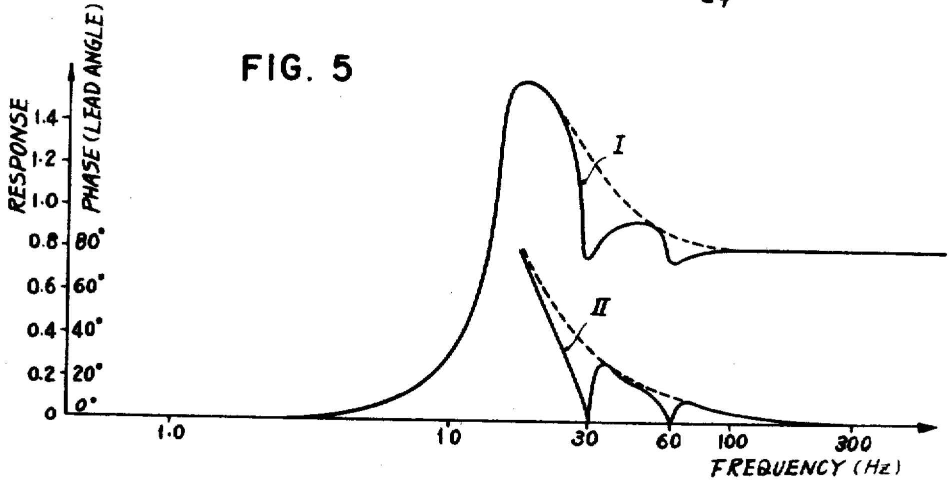
FIG. 5 shows characteristic curves of an embodiment of a high-pass filter.

Characteristic curves of the high-pass filter of the block 105 are shown in FIG. 5. In the figure, curve I shows a frequency characteristic of amplitude, and curve II shows a frequency characteristic of phase.

In the present embodiment the VTR apparatus employs two rotary magnetic heads. The rotary magnetic heads are rotated in a speed of 30 rotations per second. This two-head system VTR apparatus produces particularly inherent jitter components of 30 Hz and 60 Hz. Therefore, the characteristic curves of the filter 60 have respectively curves as shown in broken lines, which are corrected to the curves as shown in full lines I and II. The curves I and II have respectively an amplitude 0dB and phase difference 0° at 30 Hz and 60 Hz frequencies, as compared with the amplitude and phase in the frequencies higher than nearly 300 Hz. This characteristic correction is performed between the high-pass filter 60 and the mixer 63.

A mixed output signal of the mixer 63 is supplied to through an amplifier 66 and a γ amplifier 67 of a control amplifier block 106. An output of the amplifier 67 is phase splitted by a phase split 68 and thereafter supplied to a VDL driver 69. An output of the driver 69 is supplied to a variable delay line 70.

An output of the clamp circuit 46 in the block 102 is supplied to the variable delay line 70 through a video drive amplifier 50. The video signal having jitter components extending from low to high frequencies supplied from the amplifier 50 is removed and corrected of its high frequency jitter component in the variable delay line 70. This control occurs responsive to the signal derived from the high frequency jitter component and supplied from the block 106. An output signal of the variable delay circuit 70 is amplifier by an equalizing amplifier 71 and output amplifier 72, in an output amplifier block 107. Thereafter, the signal is taken out as an output signal from an output terminal 73.

This invention is not limited to these embodiments, but suitable variations and modifications may be made without departing from the scope and spirit of the invention.

What we claim is:

1. A video signal jitter correction system comprising means for supplying a reference horizontal synchronizing signal, phase modulating means for modulating said reference horizontal synchronizing signal as supplied from said supplying means, means comprising an input terminal having a video signal applied thereto, said video signal including jitter components of relatively high frequency and relatively low frequency, means for separating a horizontal synchronizing signal from the video signal supplied through the input terminal, phase comparing means for comparing the phase of the modulated reference horizontal synchronizing signal supplied from said phase modulating means with the phase of the horizontal synchronizing signal supplied from the synchronizing signal separation means, said phase comparing means producing an error signal responsive to the jitter component, low-pass filter means for taking out a jitter component of relatively low frequency from the output signal of the phase comparing means, said low-pass filter means supplying the taken out low frequency jitter component to said phase modulating means, said phase modulating means modulating said reference horizontal synchronizing signal with said low frequency jitter component, high-pass filter means for taking out a jitter component of relatively high frequency from the output signal of the phase comparing means, and means responsive to the high frequency jitter component supplied from said high-pass filter means for correcting the high frequency jitter component included in the video signal supplied through said input terminal.

2. The system of claim 1 and a video tape recorder, said video signal having the jitter components being a signal reproduced from magnetic tape by said video tape recorder, said reference horizontal synchronizing signal supplying means including an input terminal having a reference video signal applied thereto, and means for separating the horizontal synchronizing signal from the reference video signal.

3. The system of claim 1 in which the frequency of said jitter component of relatively low frequency is less than approximately 10 Hz and the frequency of said jitter component of relatively high frequency is more than approximately 10 Hz.

4. A jitter correction system comprising a first input terminal having a reference video signal applied thereto, a first separating means for separating a reference horizontal synchronizing signal from the reference video signal, phase modulating means for modulating said reference horizontal synchronizing signal, means responsive to the modulated reference horizontal synchronizing signal for generating a comparison waveform, a second input terminal having applied thereto a video signal reproduced from a magnetic tape in a video tape recorder, said reproduced video signal including jitter components of relatively high frequency and relatively low frequency, second separating means for separating a horizontal synchronizing signal from the reproduced video signal, means responsive to the horizontal synchronizing signal supplied from said second separating means for generating a sampling pulse, sampling means for sampling the comparison waveform supplied from said comparison waveform generating means with the sampling pulse supplied from said sampling pulse generating means, said sampling means producing an error signal responsive to the jitter component, low-pass filter means for taking out a jitter component of relatively low frequency from the output signal of the phase comparing means, said low-pass filter means supplying the taken out low frequency jitter component to said phase modulating means, said phase modulating means modulating said reference horizontal synchronizing signal with said low frequency jitter component, high-pass filter means for taking out a jitter component of relatively high frequency from the output signal of the phase comparing means, and means for correcting the high frequency jitter component included in the video signal supplied through said second input terminal responsive to the high frequency jitter component supplied from said high-pass filter means.

5. The system of claim 4 in which said phase modulating means includes means responsive to the reference horizontal synchronizing signal for generating a reference saw tooth wave having a frequency with a period equal to one horizontal scanning line period, means responsive to the signal supplied from the low-pass filter means for phase modulating the saw tooth wave, means responsive to the output of the phase modulating means for forming a pulse having a jitter component, said phase comparing means including means responsive to the pulse signal supplied from the pulse forming means for generating a saw tooth wave, means responsive to the horizontal synchronizing signal supplied from the synchronizing signal separation means for generating a sampling pulse, and phase detecting means for sampling the saw tooth wave supplied from the generating means in response to the sampling pulse, said signal supplied to the phase modulating means being an error signal formed responsive to the jitter component of relatively low frequency.

6. The system of claim 4 in which said video signal is reproduced from the magnetic tape in the video tape recorder by two rotary magnetic head rotating at 30 rotations per second, and said high-pass filter means has characteristics which are corrected to have an amplitude of substantially O dB and a phase difference of 0° at frequencies of 30 Hz and 60 Hz as compared with an amplitude and phase in the frequencies higher than nearly 300 Hz.

* * * * *